US009296185B2

(12) United States Patent
Nadella et al.

(10) Patent No.: US 9,296,185 B2
(45) Date of Patent: Mar. 29, 2016

(54) METHOD FOR JOINING THERMOPLASTIC POLYMER MATERIAL (75) Inventors: Krishna Nadella, Seattle, WA (US); Xiaoxi Wang, Mukilteo, WA (US); Vipin Kumar, Seattle, WA (US)

(73) Assignees: Dart Container Corporation, Mason, MI (US); University of Washington, Seattle, WA (US)

( * ) Notice: Subject to any disclaimer, the term of this patent is extended or adjusted under 35 U.S.C. 154(b) by 0 days.

(21) Appl. No.: 13/640,665

(22) PCT Filed: Apr. 19, 2011

(86) PCT No.: PCT/US2011/033075
§ 371 (c)(1),
(2), (4) Date: Oct. 11, 2012

(87) PCT Pub. No.: WO2011/133568
PCT Pub. Date: Oct. 27, 2011

(65) Prior Publication Data
US 2013/0032289 A1 Feb. 7, 2013

Related U.S. Application Data (60) Provisional application No. 61/342,752, filed on Apr. 19, 2010.

(51) Int. Cl.
*B29C 65/02* (2006.01)
*B32B 37/04* (2006.01)
(Continued)

(52) U.S. Cl.
CPC ............... *B32B 37/04* (2013.01); *B29C 44/06* (2013.01); *B29C 65/203* (2013.01);
(Continued)

(58) Field of Classification Search
CPC .... B32B 5/18; B32B 2305/022; B32B 37/04; B29K 2105/046; B29C 65/02; B29C 66/723; B29C 44/348; B29C 44/3469
USPC .......................................... 156/77, 78, 309.6
See application file for complete search history.

(56) References Cited

U.S. PATENT DOCUMENTS

| 1,948,568 A | 2/1934 | Faber |
| 2,224,997 A | 12/1940 | Weisse |

(Continued)

FOREIGN PATENT DOCUMENTS

| CA | 2012985 A1 | 9/1991 |
| EP | 0329490 A2 | 8/1989 |

(Continued)

OTHER PUBLICATIONS

Wang, "Solvent-free Fabrication of Porous Polymer for Tissue Engineering Applications," University of Washington, Dept. of Mechanical Engineering (dissertation), 2007.

(Continued)

*Primary Examiner* — Scott W Dodds
(74) *Attorney, Agent, or Firm* — McGarry Bair PC (57) ABSTRACT

A method for joining two components includes positioning a thermoplastic polymer portion of a first component adjacent a thermoplastic polymer portion of a second component such that the first and second portions form an interface. At least one of the portions includes a microstructure having a plurality of closed cells, each cell containing a void and each cell having a maximum dimension extending across the void. The method also includes exerting pressure on the thermoplastic polymer portions to form a bond at the interface that holds the portions together. The plurality of closed cells, and especially those adjacent the surface of the thermoplastic polymer portion that form the interface, help isolate thermally and/or chemically the surface from the remainder of the portion.

19 Claims, 4 Drawing Sheets

(51) Int. Cl.
| | |
|---|---|
| *B29C 44/06* | (2006.01) |
| *B29C 65/20* | (2006.01) |
| *B29C 65/00* | (2006.01) |
| *B32B 27/06* | (2006.01) |
| *B32B 37/20* | (2006.01) |
| *B32B 38/00* | (2006.01) |
| *B29K 105/04* | (2006.01) |
| *B29C 65/10* | (2006.01) |
| *B29C 65/14* | (2006.01) |
| *B29C 65/30* | (2006.01) |
| *B29C 65/82* | (2006.01) |
| *B32B 37/12* | (2006.01) |
| *B29L 31/00* | (2006.01) |
| *B29C 65/48* | (2006.01) |

(52) U.S. Cl.
CPC ............ *B29C 66/1122* (2013.01); *B29C 66/45* (2013.01); *B29C 66/727* (2013.01); *B29C 66/73921* (2013.01); *B29C 66/8264* (2013.01); *B29C 66/83413* (2013.01); *B29C 66/9292* (2013.01); *B32B 27/065* (2013.01); *B29C 65/10* (2013.01); *B29C 65/1412* (2013.01); *B29C 65/30* (2013.01); *B29C 65/483* (2013.01); *B29C 65/8253* (2013.01); *B29C 66/71* (2013.01); *B29K 2105/041* (2013.01); *B29K 2105/043* (2013.01); *B29K 2105/046* (2013.01); *B29L 2031/776* (2013.01); *B32B 37/12* (2013.01); *B32B 37/203* (2013.01); *B32B 2038/0084* (2013.01); *B32B 2250/22* (2013.01); *B32B 2266/08* (2013.01); *B32B 2305/022* (2013.01); *B32B 2309/04* (2013.01); *B32B 2309/105* (2013.01); *B32B 2309/12* (2013.01); *B32B 2367/00* (2013.01); *B32B 2607/00* (2013.01); *Y10T 156/10* (2015.01)

(56) References Cited

U.S. PATENT DOCUMENTS

| | | | |
|---|---|---|---|
| 2,317,448 A | 4/1943 | Dreyfus | |
| 2,629,312 A | 2/1953 | Davis | |
| 2,755,029 A | 7/1956 | Speed et al. | |
| 2,917,217 A | 12/1959 | Sisson | |
| 3,217,845 A | 11/1965 | Reynolds et al. | |
| 3,244,537 A | 4/1966 | Cease | |
| 3,260,781 A | 7/1966 | Lux | |
| 3,364,519 A | 1/1968 | Pitsch | |
| 3,557,265 A | 1/1971 | Chrisholm | |
| 3,610,000 A | 10/1971 | Lopata | |
| 3,617,311 A | 11/1971 | Beltle | |
| 3,744,402 A | 7/1973 | Piegza | |
| 3,803,332 A | 4/1974 | Sieferth | |
| 3,836,624 A | 9/1974 | Ferris | |
| 3,845,915 A | 11/1974 | Schmidt et al. | |
| 3,846,526 A | 11/1974 | Wade | |
| 3,883,625 A | 5/1975 | Thomas | |
| 3,895,911 A | 7/1975 | Prins | |
| 3,923,556 A | 12/1975 | Iszcukiewicz | |
| 3,937,777 A | 2/1976 | Wienand | |
| 3,955,482 A | 5/1976 | Moen | |
| 3,978,260 A | 8/1976 | Dobbins et al. | |
| 4,003,184 A | 1/1977 | Shiu | |
| 4,003,302 A | 1/1977 | Mencacci | |
| 4,059,660 A | 11/1977 | Roth | |
| 4,074,941 A | 2/1978 | Jablonski | |
| 4,188,432 A | 2/1980 | Holden | |
| 4,284,596 A | 8/1981 | Inokuchi | |
| 4,304,747 A | 12/1981 | Lake | |
| 4,386,188 A | 5/1983 | Grancio | |
| 4,424,287 A | 1/1984 | Johnson | |
| 4,456,571 A | 6/1984 | Johnson | |
| 4,473,665 A | 9/1984 | Martini-Vvedensky | |
| D277,632 S | 2/1985 | Staufenberg | |
| 4,511,520 A | 4/1985 | Bowen | |
| 4,552,789 A | 11/1985 | Winchell | |
| 4,608,009 A | 8/1986 | Whiteside | |
| 4,616,991 A | 10/1986 | Bach et al. | |
| 4,632,862 A | 12/1986 | Mullen et al. | |
| 4,673,695 A | 6/1987 | Aubert | |
| 4,693,856 A | 9/1987 | Rubens | |
| 4,756,091 A | 7/1988 | Van Denend | |
| 4,761,256 A | 8/1988 | Hardenbrook | |
| 4,848,543 A | 7/1989 | Doboze | |
| 4,886,563 A | 12/1989 | Bennett | |
| 4,894,248 A | 1/1990 | Pappas | |
| 4,911,869 A | 3/1990 | Meyer | |
| 4,981,631 A | 1/1991 | Cheung | |
| 5,047,280 A | 9/1991 | Bach | |
| 5,128,202 A | 7/1992 | Subramanian | |
| 5,145,107 A | 9/1992 | Silver | |
| 5,158,986 A | 10/1992 | Cha | |
| 5,172,443 A | 12/1992 | Christ | |
| 5,182,307 A | 1/1993 | Kumar | |
| 5,207,008 A | 5/1993 | Wimburger | |
| 5,217,660 A | 6/1993 | Howard | |
| 5,223,545 A | 6/1993 | Kumar | |
| 5,303,484 A | 4/1994 | Hagen | |
| 5,334,356 A | 8/1994 | Baldwin | |
| 5,362,436 A | 11/1994 | Wagner | |
| 5,364,696 A | 11/1994 | Wagner | |
| 5,369,135 A | 11/1994 | Campbell | |
| 5,437,846 A | 8/1995 | Roumagnac | |
| 5,484,640 A | 1/1996 | Mullen et al. | |
| 5,589,243 A | 12/1996 | Day | |
| 5,640,784 A | 6/1997 | Rochelau | |
| 5,684,055 A | 11/1997 | Kumar | |
| 5,723,510 A | 3/1998 | Kabumoto | |
| 5,747,085 A | 5/1998 | Veltman | |
| 5,783,610 A | 7/1998 | Fukushima | |
| 5,792,295 A | 8/1998 | Huebmer | |
| 5,835,657 A | 11/1998 | Suarez | |
| 5,844,731 A | 12/1998 | Kabumoto | |
| 5,846,582 A | 12/1998 | Mayfield | |
| 5,867,920 A | 2/1999 | Rogne | |
| 5,894,046 A | 4/1999 | Kim | |
| 5,904,946 A | 5/1999 | Kemp | |
| 5,955,014 A | 9/1999 | Raukola | |
| 6,012,583 A | 1/2000 | Ramirez | |
| 6,025,049 A | 2/2000 | Ouelette et al. | |
| 6,074,678 A | 6/2000 | Blackwelder | |
| 6,083,580 A | 7/2000 | Finestone et al. | |
| 6,102,313 A | 8/2000 | Salzsauler | |
| 6,235,380 B1 | 5/2001 | Tupil | |
| 6,365,249 B1 | 4/2002 | Al Ghatta | |
| 6,403,663 B1 | 6/2002 | DeSimone | |
| D476,861 S | 7/2003 | Zettle | |
| 6,656,671 B1 | 12/2003 | Aylward | |
| 6,773,791 B1 | 8/2004 | Ruggie et al. | |
| 6,884,377 B1 | 4/2005 | Bernham | |
| 6,884,823 B1 | 4/2005 | Pierick | |
| 6,948,378 B2 | 9/2005 | Solberg | |
| 6,979,494 B2 | 12/2005 | Berrier et al. | |
| 7,041,187 B2 | 5/2006 | Park et al. | |
| 7,083,849 B1 | 8/2006 | Albrecht | |
| 7,364,659 B2 | 4/2008 | Jang | |
| 7,501,175 B2 | 3/2009 | Branch | |
| 7,807,260 B2 | 10/2010 | Nadella | |
| 8,568,125 B2 | 10/2013 | Branch et al. | |
| 2001/0020513 A1* | 9/2001 | Tupil et al. | ............... 156/244.23 |
| 2001/0032903 A1 | 10/2001 | Durrance | |
| 2002/0168509 A1 | 11/2002 | Desimone | |
| 2003/0130364 A1 | 7/2003 | Vo | |
| 2003/0138570 A1 | 7/2003 | Kaylor et al. | |
| 2004/0005449 A1 | 1/2004 | Sugimoto | |
| 2004/0250628 A1 | 12/2004 | Solberg | |
| 2005/0035495 A1 | 2/2005 | Baker | |
| 2005/0058824 A1 | 3/2005 | Fujimoto | |
| 2005/0115975 A1 | 6/2005 | Smith | |
| 2005/0181196 A1 | 8/2005 | Aylward | |
| 2005/0203198 A1* | 9/2005 | Branch et al. | ................... 521/91 |

(56) References Cited

U.S. PATENT DOCUMENTS

| | | |
|---|---|---|
| 2005/0214512 A1 | 9/2005 | Fascio |
| 2005/0233036 A1 | 10/2005 | Feldmeier |
| 2006/0073298 A1 | 4/2006 | Hutchinson |
| 2006/0144915 A1 | 7/2006 | Sadlier |
| 2006/0284331 A1 | 12/2006 | Branch |
| 2007/0087089 A1 | 4/2007 | Heymann |
| 2007/0109382 A1 | 5/2007 | LaFleche |
| 2007/0292807 A1 | 12/2007 | Campbell |
| 2008/0087715 A1 | 4/2008 | Robertson |
| 2008/0274346 A1 | 11/2008 | Miller |
| 2008/0277817 A1 | 11/2008 | Miller |
| 2008/0280123 A1 | 11/2008 | Miller |
| 2009/0035596 A1 | 2/2009 | Higashi |
| 2009/0065136 A1 | 3/2009 | Nadella |
| 2009/0104420 A1 | 4/2009 | Nadella et al. |
| 2009/0309250 A1 | 12/2009 | Nadella |
| 2009/0321974 A1 | 12/2009 | Branch et al. |
| 2010/0028654 A1 | 2/2010 | Takase |
| 2010/0062235 A1 | 3/2010 | Nadella |
| 2011/0081524 A1 | 4/2011 | Nadella |

FOREIGN PATENT DOCUMENTS

| | | |
|---|---|---|
| EP | 0371392 | 6/1990 |
| EP | 1055499 A1 | 11/2000 |
| EP | 1636008 A2 | 12/2004 |
| EP | 1526093 | 4/2005 |
| EP | 2153982 A1 | 2/2010 |
| GB | 2044672 A | 10/1980 |
| JP | 08-174648 | 7/1996 |
| JP | 11-080408 | 3/1999 |
| JP | 11-170288 | 6/1999 |
| WO | WO9618486 A2 | 6/1996 |
| WO | WO9721377 A2 | 6/1997 |
| WO | WO 01-36521 A2 | 5/2001 |
| WO | WO0136521 A2 | 5/2001 |
| WO | WO2004010472 | 2/2004 |
| WO | WO2004103675 | 2/2004 |
| WO | WO2004103828 A2 | 12/2004 |
| WO | WO2009036328 A2 | 3/2009 |
| WO | WO2010012353 A1 | 2/2010 |

OTHER PUBLICATIONS

Kumar, "A model for the unfoamed skin on microcellular foams", 1994, Polymer Engineering & Science 34(3) pp. 169-173.

Holl "A steady-state mass balance model of the polycarbonate CO2 System", 2001, Journal of Polymer Science Part B, vol. 39 p. 868-880.

Kumar, "A process for making thermoplastic parts", 1990, 30(20), Polymer Engineering and Science, Oct. 1990, p. 1323-1329.

Kumar, "Semi-continuous production of solid state PET foams," Society of Plastics Engineers Conference Proceedings, 1995, vol. II, pp. 2189-2192.

Holl "An in situ study of plasticization of polymers by high-pressure gases", 1998, Journal of Polymer Science Part A: polymer chemistry 36(6) p. 977-982.

International Search Report for Application No. PCT/US2008/051360 dated Sep. 26, 2008.

Yousefpour, "Fusion bonding/welding of thermoplastic composites", Journal of Thermoplastic Composite Materials Jul. 2004 vol. 17 No. 4 303-341.

Goel, "Generation of Microcellular Polymers using Supercritical CO2", Cellular Polymers: Heriot-Watt University, Mar. 23-25, 1993, p. 25.

Seeler, "Net-shape sintered microcellular foam parts, SPE Technical Papers", vol. XLIII, 1997, pp. 2032-2036.

Young, "Polymer-Solvent Phase Separation as a Route to Low Density, Microcellular Plastic Foams", Journal of Cellular Plastics, 1987. 23(1): p. 55.

Zhang, "An in situ study of plasticization of polymers by high-pressure gases", 1998, Journal of Polymer Science Part A: polymer chemistry 36(6) p. 977-982.

Arora et al, "Preparation and characteristization of microcellular polystyrene foams processed in supercritical carbon dioxide," Macromolecules 31, p. 4614-4620 (1998).

Wang et al., "A method for solvent-free fabrication of porous polymer using solid-state foaming and ultrasound and tissue engineering applications," Biomaterials 27 (2006).

Mehta et al, "Prediction of Density Variation in Thick Microcellular Sheets," UW ME Course Project Report Autumn 200.

Nadella et al, "Prediction of Density Variation in Thick Microcellular Sheets," ANTEC 2004, p. 2610-2614.

Holl et al; "An in situ study of plasticization of polymers by high-pressure gases", Journal of Polymer Science Part A: polymer chemistry 36(6) p. 977-982; 1998.

International Search Report and Written Opinion dated Jun. 22, 2011 for PCT/US2011/033075 filed Apr. 19, 2011.

Extended European Search Report dated Nov. 25, 2013 for EP 11772567.1.

* cited by examiner

METHOD FOR JOINING THERMOPLASTIC POLYMER MATERIAL

CROSS REFERENCE TO RELATED APPLICATION AND CLAIM OF PRIORITY

This application claims priority from commonly owned U.S. Provisional Patent Application 61/342,752 filed 19 Apr. 2010, and titled "A Panel That Includes An Expanded Microcelluar Material, And Related Methods For Making And Using The Same", which is incorporated by reference.

BACKGROUND

Many products, such as wall panels, wall coverings, and decorative tiles, are made of a wide variety of materials. These materials include corrugated paper, textiles, glass, glass fiber, metals (such as tin, steel, and aluminum), ceramics (such as porcelain), wood, and plastics. For many of these products some of these materials have good mechanical properties and surface quality; some are inexpensive and affordable; and some are highly resistant to mold and/or mildew.

Unfortunately, though, for many products none of these materials individually have good mechanical properties, good surface qualities, is inexpensive, and highly resistant to mold and mildew. In addition, many of these materials have other drawbacks. For example, many include chemical additives such as, volatile organic compounds (VOCs), that can be harmful to people and/or the environment. Many do not provide good thermal insulation, which can cause excessive energy consumption. Many are not easily recyclable. And, many are not lightweight, and thus, require more energy to transport and stronger structures to support and hold the products during use.

A possible alternative to such materials are thermoplastic polymers because they are inexpensive, highly resistant to mold and/or mildew, and can be easily formed into shapes that can provide good mechanical properties when subjected to a particular loading, and can be made to have a good surface quality. Thermoplastic polymers can also be made very light by foaming them to generate a material structure that includes many cells, and they can be easily recycled.

Thermoplastic polymers are frequently manufactured in thin sheets that are then wound around a spool. When manufactured in this manner, the thin sheet is typically used to make components that are also thin. When such a sheet is used to make a component that is thicker than the sheet, the sheet is cut into sections and then each section is joined to the other sections to form a laminate. Adhesion bonding and/or fusion bonding typically join the sections together. Adhesion bonding includes applying an adhesive to a surface of a section and then pressing the two sections together while the adhesive cures. Fusion bonding includes melting a surface of both sections, and then pressing the sections together while the two molten surfaces coalesce. Then the coalesced surfaces are cooled to solidify them as one material.

Unfortunately, adhesion bonding typically releases VOCs as the adhesive cures, and fusion bonding requires very delicate control of the process to maintain the general shape of the laminate as the surfaces are melted, coalesce, and solidify.

SUMMARY

In an aspect of the invention, a method for joining two components includes positioning a thermoplastic polymer portion of a first component adjacent a thermoplastic polymer portion of a second component such that the first and second portions form an interface. At least one of the portions includes a microstructure having a plurality of closed cells, each cell containing a void and each cell having a maximum dimension extending across the void within the cell that ranges between 1 micrometer and 200 micrometers long. The method also includes exerting pressure on the thermoplastic polymer portions to form a bond at the interface that holds the portions together. The plurality of closed cells, and especially those adjacent the surface of the thermoplastic polymer portion that form the interface, help isolate thermally and/or chemically the surface from the remainder of the portion, and thus allow the surface of the portion to exist in a molten and/or dissolved state while the remainder of the portion exists in a more solid state. With the remainder of the thermoplastic polymer portion in the solid state, the portion can withstand the pressure exerted on the thermoplastic polymer portions while the bond forms, without deforming the general shape of the portion.

In another aspect of the invention such a method also includes generating pressure inside a plurality of the closed cells to help the cells resist the pressure exerted on the thermoplastic polymer portion while the bond forms at the interface. By resisting the pressure exerted on the portion in this manner, the portion can more easily withstand the pressure exerted on the thermoplastic polymer portions while the bond forms, without deforming the general shape of the portion.

DETAILED DESCRIPTION

Figure 1:
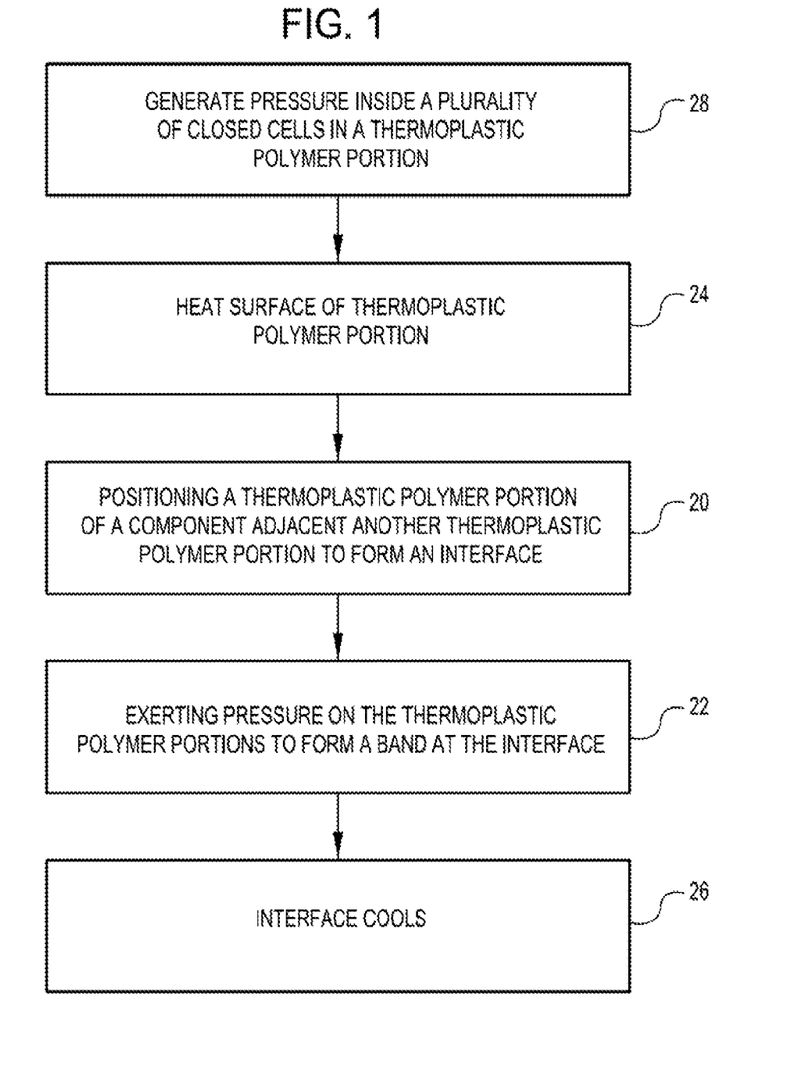
FIG. 1 is a schematic view of a process for joining thermoplastic portions of components, according to an embodiment of the invention.

FIG. 1 is a schematic view of a process for joining thermoplastic polymer portions of one or more components, according to an embodiment of the invention. The one or more components may be a component of a wall panel, a wall covering, decorative tile, or any other product or device in which a thermoplastic polymer may be incorporated. The process may be used to generate a fusion bond between the thermoplastic polymer portions, or an adhesion bond by adding an adhesive between the thermoplastic polymer portions.

When used to generate an adhesion bond, the adhesive may be any desired adhesive that provides the desired bond structure and strength, and may include a chemical that dissolves some of the thermoplastic polymer portion to provide better joining between the adhesive and portion.

In the first step 20 of the process, a thermoplastic polymer portion of a first component (not shown in FIG. 1, but shown and discussed in conjunction with FIGS. 2A-4) is positioned adjacent a thermoplastic polymer portion of a second component (not shown in FIG. 1, but shown and discussed in conjunction with FIGS. 2A-4) such that the first and second portions form an interface (also not shown in FIG. 1, but shown and discussed in conjunction with FIGS. 2A-4). At least one of the portions includes a microstructure having a plurality of closed cells (not shown in FIG. 1, but shown and discussed in conjunction with FIGS. 5 and 6), each cell containing a void and each cell having a maximum dimension extending across the void within the cell that ranges between 1 and 200 micrometers (μm) long. In the next step 22 of the process, pressure is exerted on the thermoplastic polymer portions to form a bond at the interface that holds the portions together. The plurality of closed cells, and especially those adjacent the surface of the thermoplastic polymer portion that form the interface, help isolate, thermally and/or chemically, the surface from the remainder of the portion, and thus allow the surface of the portion to exist in a molten and/or dissolved state while the remainder of the portion exists in a more solid state. The surface may be molten if a fusion bond at the interface is desired, and the surface may be dissolved if an adhesion bond is desired. With the remainder of the thermoplastic polymer portion in a solid state, the portion can withstand the pressure exerted on the thermoplastic polymer portions while the bond forms, without deforming the general shape of the portion.

In this and other embodiments of the process, the process also includes a step 24 in which the interface-forming surface of the thermoplastic polymer portion having the plurality of closed cells is heated to a temperature that causes the surface to melt. In this and other embodiments, the thermoplastic polymer portion includes a skin (shown and discussed in greater detail in conjunction with FIGS. 5 and 6) that defines the interface-forming surface and that becomes molten as heat is applied to it while many of the plurality of closed cells underneath the skin remain in a solid state. When the surface is molten and pressure is exerted on the thermoplastic polymer portions, the molten surface heats the surface of the other thermoplastic polymer portion that it contacts and the two surfaces coalesce. Then, at step 26, the interface between the thermoplastic portions cools, and as it cools the coalesced surfaces solidify or fuse together to form a fusion bond at the interface (not shown in FIG. 1, but shown and discussed in conjunction with FIGS. 2A and 2B).

Other embodiments are possible. For example, both surfaces may be heated to facilitate their coalescence. As another example, the interface-forming surface of the thermoplastic polymer portion having the plurality of closed cells may be heated to a temperature substantially below the melting point of the surface to facilitate the formation of an adhesion bond. As another example, the interface-forming surface may not include a skin and instead may be defined by the walls of the cells disposed at and immediately adjacent the face of the thermoplastic polymer portion. In such an example, heat may be applied to the cells immediately adjacent the face to melt the cells in preparation for forming a fusion bond.

In this and other embodiments of the process, the process also includes a step 28 in which pressure inside a plurality of the closed cells—in the voids of the closed cells—is generated to help the cells resist the pressure exerted on the thermoplastic polymer portion while the bond forms at the interface. By resisting the pressure exerted on the portion in this manner, the portion can more easily withstand the pressure exerted on the thermoplastic polymer portions while the bond forms, without deforming the general shape of the portion. Pressure inside a plurality of the closed cells also allows more pressure to be exerted on the thermoplastic polymer portions to form the bond at the interface. In this and other embodiments, the pressure inside the closed cells may be generated as the closed cells are created in the thermoplastic polymer portion (discussed in greater detail in conjunction with FIGS. 4-6).

Figure 2A:
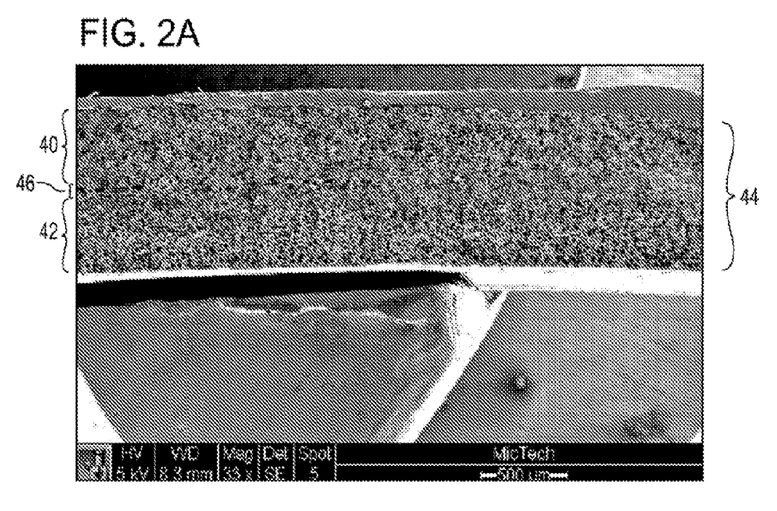
FIG. 2A is a photograph of a cross-section of two thermoplastic sheets fused together, according to an embodiment of the invention. The photograph shows the cross-section at a magnification of 33 times its actual size.
Figure 2B:
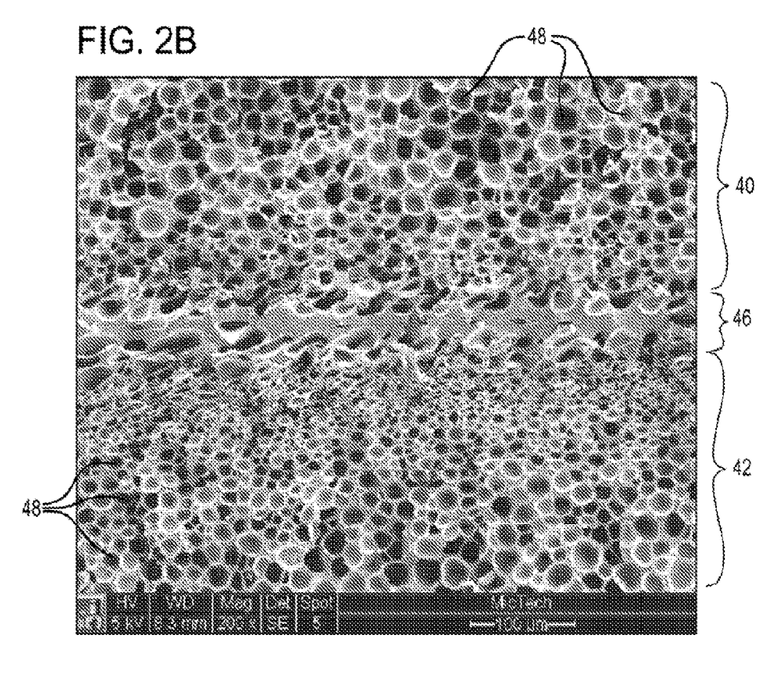
FIG. 2B is a photograph of a portion of the cross-section shown in FIG. 2A and includes the fused portion of the two sheets. The photograph shows the portion of the cross-section at a magnification of 200 times its actual size.

FIG. 2A is a photograph of a cross-section of two thermoplastic polymer sheets 40 and 42 fused together to form a panel 44, according to an embodiment of the invention. The photograph shows the cross-section at a magnification of 33 times its actual size. FIG. 2B is a photograph of a portion of the cross-section shown in FIG. 2A and includes the fused portion of the two sheets 40 and 42. The photograph in FIG. 2B shows the portion of the cross-section at a magnification of 200 times its actual size.

In this and other embodiments, the panel 44 includes a fusion bond 46 that is about 40 μm (about 0.0016 inches) thick. The fusion bond 46 is formed by material in the interface-forming surface of each of the sheets 40 and 42 melting, coalescing, and then hardening. Because of this, the amount, continuity and heat transfer characteristics of the material in each of the interface-forming surfaces affects the process for forming a good quality fusion band joining the two sheets 40 and 42. To obtain a quality, strong bond in the panel 44, a skin (shown and discussed in conjunction with FIGS. 6 and 6) in each sheet is formed, and defines the interface-forming surface of each of the sheets 40 and 42. The skin can provide ample material for fusion. In addition, if the microstructure of the sheets 40 and 42 are formed by the process shown and discussed in conjunction with FIGS. 5 and 6, then the skin can also slow the loss of pressure inside one or more of the closed cells. This, in turn, allows more time to heat the skin to melt the interface-forming surface, position the sheets 40 and 42 to form the interface, and then exert pressure on the sheets to form the fusion bond at the interface.

In this and other embodiments of the panel 44, each of the thermoplastic polymer sheets 40 and 42 is about 500 μm (about 0.02 inches) thick, and includes recycled polyethylene terephthalate (RPET). In addition, each of the sheets 40 and 42 includes a microstructure that includes many closed cells 48 (only 6 labeled in FIG. 2A for clarity)—about $10^8$ or more per cubic centimeter ($cm^3$). The size of each closed cell 48 ranges between 1 and 50 μm long at its maximum dimension that extends across the void. Because the geometry of each closed-cell is rarely, if at all, a perfect sphere, the size of each closed cell is arbitrarily identified as the length of the longest chord that extends through the void within the closed cell. For example, the size of an oblong cell would be the length of the longest chord that extends in the same direction as the cell's elongation, and the size of a sphere would be the length of the sphere's diameter.

With the closed-cell microstructure of each of the sheets 40 and 42 thermally isolating the interface-forming surface of each of the sheets, one can heat the skin of each sheet to the interface-forming surface's melting temperature without causing the remainder of the sheet underneath the skin to melt. Thus, the microstructure of the panel 44 can retain the microstructure of each of the sheets 40 and 42 before the sheets are fused together. Thus, a panel 44 can be formed whose thickness can be dimensionally precise and consistent without substantial processing after the sheets 40 and 42 are joined. In addition, confining to the skin much of the heat required to melt the skin, the thickness of each of the sheets 40 and 42 may be small and thus quickly and easily manufactured.

Still referring to FIGS. 2A and 2B, the material composition of the thermoplastic polymer sheets 40 and 42, the size of each closed cell 48, and the distribution of the closed cells 48 throughout each of the sheets 40 and 42 may be designed to provide the sheets 40 and 42 any desired mechanical properties, such as tensile strength, shear strength, and stiffness—i.e. resistance to bending. For example, the thermoplastic polymer may be any amorphous or semi-crystalline thermoplastic, such as polystyrene, polycarbonate, acrylonitrile-butadiene-styrene, glycol modified PET, polyethylene, polypropylene, NORYL (a blend of polyphenylene oxide and polystyrene), and polyvinyl chloride. The size of each closed cell may range between 1 and 200 μm long at its maximum dimension that extends across the void within the cell, and the closed cells may be uniformly dispersed throughout each of the sheets 40 and 42 as shown in the photographs of FIGS. 2A and 2B).

Other embodiments are possible. For example, three or more sheets 40 and 42 may be fused together to form a panel 44. As other examples, each of the sheets 40 and 42 may include different microstructures, such as larger or smaller closed cells than the other sheet, or different numbers and/or distributions of the closed cells in each of the sheets 40 and 42, and/or within a single sheet. Also, each of the sheets 40 and 42 may have a thickness that is different than the other sheet, and/or a density (mass of material per unit volume) that is different than the other sheet, to produce a panel 44 having any desired thickness. In addition, one or more sheets 40 and 42 may be fused together with one or more sheets of a thermoplastic polymer sheet having a solid microstructure to produce a denser panel. The solid thermoplastic sheets and the thermoplastic sheets having a closed-cell microstructure may be arranged as desired. For example, they can be fused together alternating solid and closed-cell sheets, or sandwiching one or more closed-cell sheets in between solid thermoplastic sheets. This assemblage of solid thermoplastic and expanded microcellular materials allows one to exploit the mechanical strength of a solid thermoplastic and the insulation and lightweight qualities of a closed-cell thermoplastic sheet.

Figure 3:
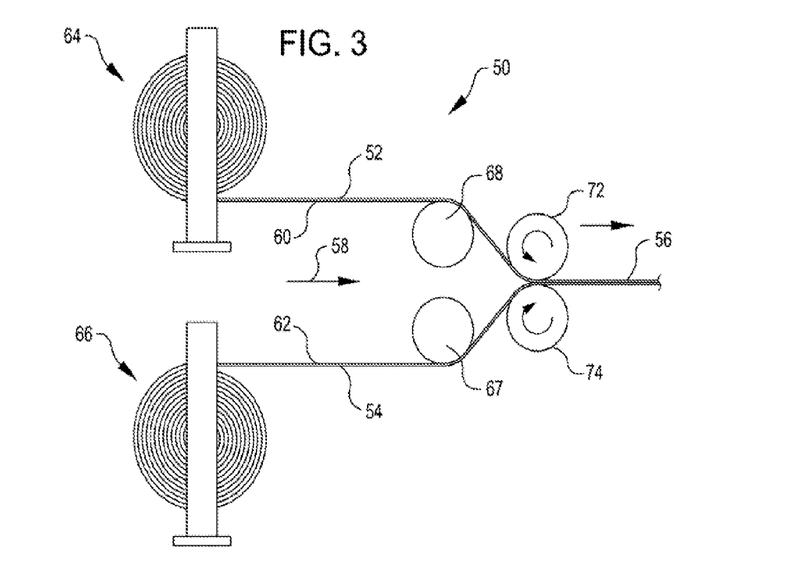
FIG. 3 shows a schematic view of a process and a system for joining two thermoplastic sheets to form a panel, according to an embodiment of the invention.

FIG. 3 shows a schematic view of a process and a system 50 for joining two thermoplastic polymer sheets 52 and 54 to form the panel 56, according to an embodiment of the invention. In this process, the sheets 52 and 54, continually move in the direction of the arrow 58 as the system 50 heats the interface-forming surfaces 60 and 62 of the sheets 52 and 54, respectively; positions the sheets so that the surfaces 60 and 62 form an interface; and exerts pressure on the sheets 52 and 54 to join the sheets and form the panel 56. In other embodiments of the process, the sheets 52 and 54 may not move while they are heated, positioned and/or pressure is exerted on them.

In this and other embodiments, each of the sheets 52 and 54 are pulled off one of the respective rolls 64 and 66 of the thermoplastic polymer material, and the surfaces 60 and 62 are heated by one of the respective electrically heated rollers 68 and 70. In other embodiments, each of the surfaces 60 and 62 may be heated by infrared heat, hot air, or any other desired method for heating a surface. After the surfaces 60 and 62 begin to melt, the sheets 52 and 54 are directed toward each other to position the surfaces 60 and 62 adjacent each other. When the two surfaces 60 and 62 are adjacent each other, they form an interface. Once the interface is formed, both sheets 52 and 54 are inserted, together, between two nip rollers 72 and 74 that exert pressure on a portion of the sheets 52 and 54 by pinching the portion. As the portion of the sheets 52 and 54 is pinched by the rollers 72 and 74, a bond between the two surfaces 60 and 62 begins to form at the interface in the portion and continues to form after the portion has been pinched and no longer between the rollers 72 and 74. If the bond is an adhesion bond, then the adhesive cures; if the bond is a fusion bond then the molten interface solidifies. To facilitate the completion of the bond and thus speed up the formation of the panel 56, the interface may subsequently be kept warm to promote the curing of the adhesive, or cooled to promote the solidification of the interface.

Figure 4:
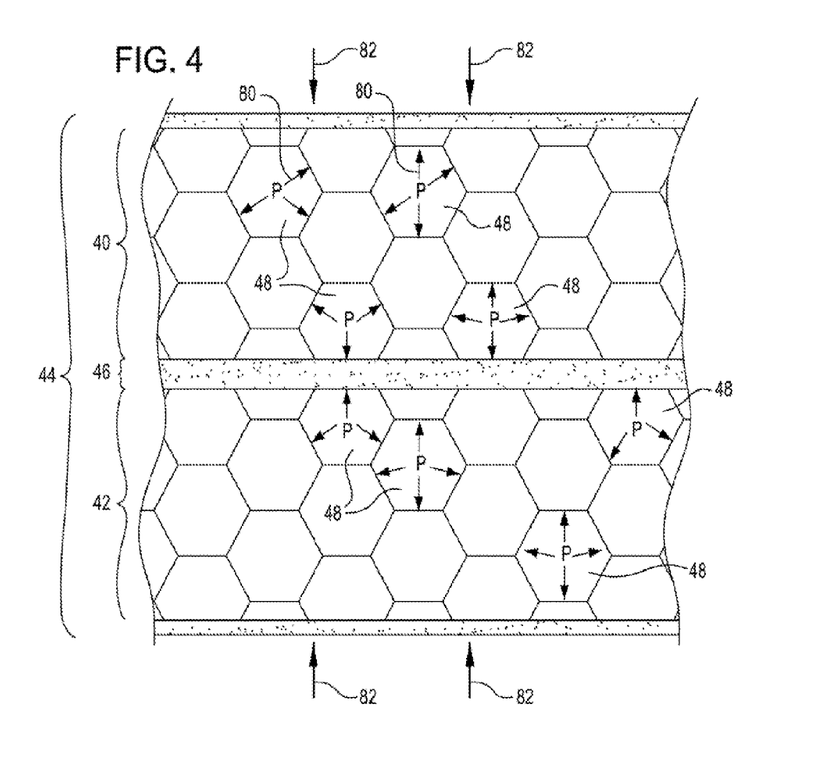
FIG. 4 is a partial, cross-sectional, schematic view of two thermoplastic sheets being joined together, according to an embodiment of the invention.

FIG. 4 is a partial, cross-sectional, schematic view of the two thermoplastic polymer sheets 40 and 42 as pressure is exerted on each to form the bond 46, according to an embodiment of the invention. In FIG. 4 each of the closed cells 48 (only eight labeled for clarity) are illustrated as a hexagon or a portion of a hexagon, but should not be considered to actually have such a cross-sectional shape because in reality, such a shape would be extremely rare.

During the bonding process, excessive heat and/or pressure can damage the microstructure of each of the sheets 40 and 42 by collapsing or crushing one or more of the closed cells—densification of the microstructure. To help prevent this, pressure 80 (labeled in only two of the closed cells 48 for clarity) may be generated inside a plurality of the closed cells 48. If the gas pressure inside the closed cells is equal to or greater than the force 82 divided by the area of each sheet 40 and 42 that the force 82 is applied to, then the force 82 exerted on the sheets 40 and 42 to form the bond 46 will not crush most of the closed cells 48. Some of the closed cells 48 close to the interface-forming surfaces of the sheets 40 and 42, are warmed as the surfaces are heated to a molten state and thus not able to resist the pressure generated by the force 82.

Figure 5:
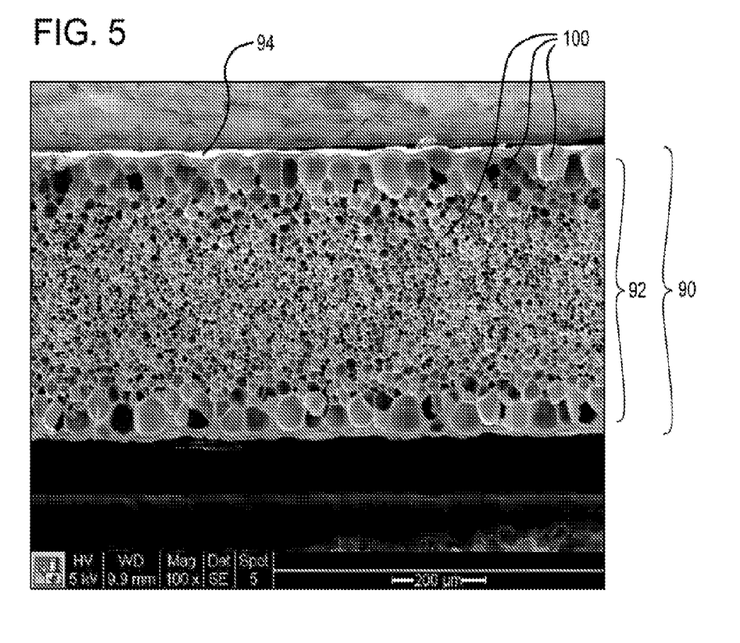
FIG. 5 is a photograph of a cross-section of a portion of a thermoplastic material having a closed-cell microstructure that can be joined with another thermoplastic material using the process illustrated in FIG. 1, according to an embodiment of the invention.
Figure 6:
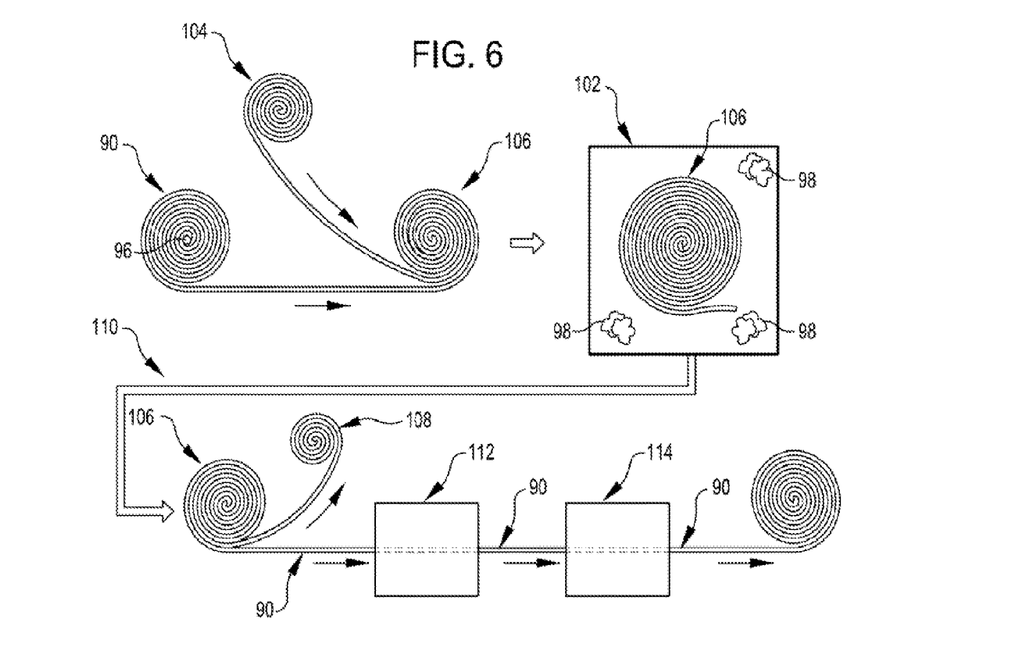
FIG. 6 is a schematic view of a process for generating a closed-cell microstructure in a thermoplastic material such as that shown in FIG. 5, according to an embodiment of the invention.

In this and other embodiments, the pressure 80 may be generated as the microstructure is formed in each of the sheets 40 and 42 (shown and discussed in greater detail in conjunction with FIGS. 5 and 6). The microstructure in the sheets 40 and 42 is formed by making a solid sheet of the polymer that has gas dissolved within it, thermodynamically unstable by reducing the pressure surrounding the sheet. When this occurs and the temperature of the sheet is or is close to the polymer's glass transition temperature, bubbles (closed cells) of the dissolved gas nucleate and grow within the sheet. When the bubbles reach a desired size, the temperature of the sheet is changed to make the polymer more rigid and stop the growth of the bubbles. At this point, the pressure inside the bubbles is greater than the pressure surrounding the sheet, and remains so until the gas dissolved in the sheet is not urged to leave the sheet by the temperature and pressure of the surrounding environment.

Because the gas has to migrate through the solid portions of the sheet to exit the sheet, it takes time for the sheet and the amount of dissolved gas within it to reach an equilibrium. Thus, it takes time for the pressure that is generated inside the closed cells 48 as the closed cells 48 are generated in the sheets 40 and 42, to equalize with the pressure surrounding the sheets 40 and 42. And thus, one can join the sheets 40 and 42 as discussed elsewhere herein, before the pressure generated inside the closed cells 48 equalizes with the surrounding environment.

The time that it takes for the pressure generated inside the closed cells 48 to equalize with the surrounding environment depends on any number of factors, such as the crystallinity of the sheets 40 and 42, the amount of solid material in the sheets 40 and 42, and the initial gas concentration in the sheets. These factors can be manipulated to provide any desired period. For example, increasing the amount of solid material that the gas has to migrate through to exit the sheet will increase the duration of the period. Thus, generating a skin as discussed in greater detail in conjunction with FIGS. 5 and 6 will increase the duration of the period. The initial gas concentration in the sheets, or the difference in pressure between the pressure at which the sheet and dissolved gas are made thermodynamically unstable and the pressure of the surrounding environment at the completion of the closed-cell microstructure formation, also influences the duration of the period. The greater the initial gas concentration, or the difference in pressure, the longer the duration.

FIG. 5 is a photograph of a cross-section of a portion of a thermoplastic polymer material 90, having a closed-cell microstructure 92 and a skin 94, that can be joined with another thermoplastic polymer material using the process illustrated in FIG. 1, according to an embodiment of the invention. FIG. 6 is a schematic view of a process for generating a closed-cell microstructure in a thermoplastic polymer material such as that shown in FIG. 5, according to an embodiment of the invention. Although the process shown and discussed in conjunction with FIG. 6 is a semi-continuous process in which the material moves as its microstructure is generated, much like a car moving in an assembly line as the car is made, the process for forming the microstructure may not be semi-continuous. In such an example, the material may remain stationary as its microstructure is generated and only move from one processing station to another.

Referring to FIG. 5, in this and other embodiments, the thermoplastic polymer material includes a skin 94 that is integral to the closed-cell microstructure 92 of the material. More specifically, the skin 94 and microstructure 92 are formed during a single process, such as that shown and discussed in conjunction with FIG. 6, and from the same initial sheet of solid thermoplastic material. Thus, the integral skin 94 can provide the material and surface characteristics, such as material continuity and thus smooth and quick heat transfer throughout the skin, that are needed to create a strong fusion bond.

Referring to FIG. 6, in this and other embodiments, a process for generating a closed-cell microstructure 92 in a thermoplastic polymer material 90 includes dissolving into the polymer 90 (here shown as a film rolled around a drum 96, but may be a block or thin sheet) a gas 98 that does not react with the polymer 90. The process also includes making the polymer 90 with the dissolved gas thermodynamically unstable at a temperature that is or close to the polymer and dissolved gas combination's glass transition temperature— the temperature at which the polymer 90 is easily malleable but has not yet melted. With the temperature at or near the glass transition temperature, bubbles 100 (only three labeled in FIG. 5 for clarity) of the gas 98 can nucleate and grow in regions of the polymer 90 that, are thermodynamically unstable—i.e. supersaturated. When the bubbles 100 have grown to a desired size, the temperature of the polymer 90 is reduced below the glass transition temperature to stop the bubbles' growth, and thus provide the polymer 90 with a microstructure having closed-cells whose size may range between 1 and 200 µm long.

In the process, the first step 102 is to dissolve into the polymer 90 any desired gas 98 that does not react with the polymer 90. For example, in this and certain other embodiments of the process, the gas 98 may be carbon dioxide ($CO_2$) because $CO_2$ is abundant, inexpensive, and does not react with PET. In other embodiments of the process, the gas may be nitrogen and/or helium. Dissolving the gas 98 into the polymer 90 may be accomplished by exposing the polymer for a period of time to an atmosphere of the gas 98 having a temperature and a pressure. The temperature, pressure, and period of time may be any desired temperature, pressure, and period of time to dissolve the desired amount of gas 98 into the polymer 90. The amount of gas 98 dissolved into the polymer 90 is directly proportional to the pressure of the gas 98 and the period of time that the polymer 90 is exposed to the gas 98 at a specific temperature and specific pressure, but is inversely proportional to the temperature of gas 98. For example, in this and certain other embodiments, the temperature may be 72° Fahrenheit, the pressure may be 725 pounds per square inch (psi), and the duration of the period may be 10 hours. This typically saturates the polymer 90 with the gas 98. In other embodiments, the pressure may range between 500 psi and 1000 psi, and the duration of the period may range between 4 hours and 24 hours.

Because the layers of the rolled polymer film 90 that lie between adjacent layers or between a layer and the drum 96 are substantially unexposed to the atmosphere when the roll is placed in the atmosphere, a material 104 is interleaved between each layer of the rolled polymer film that exposes each layer to the atmosphere. In this and certain other embodiments, the material 104 includes a sheet of cellulose, and is disposed between each layer of the polymer film 90 by merging the sheet with the film and then rolling the combination into a single roll 106. The material 104 exposes each layer of the polymer film 90 by allowing the gas to easily pass through it. After the gas 98 has saturated the polymer film 90, the material 104 may be removed from the roll 106 and saved as a roll 108 for re-use.

The next step 110 in the process includes exposing the polymer film 90 with the dissolved gas 98 to an atmosphere having less pressure than the one in the first step to cause the combination of the polymer film 90 and the gas 98 dissolved in the polymer film 90 to become thermodynamically unstable—i.e. the whole polymer or regions of the polymer to become supersaturated with the dissolved gas 98. For example, in this and certain other embodiments, the reduction in pressure may be accomplished by simply exposing the polymer film 90 to atmospheric pressure, which is about 14.7 psi, in the ambient environment.

When the combination of the polymer film 90 and the dissolved gas 98 becomes thermodynamically unstable, the dissolved gas tries to migrate out of the film 90 and into the ambient environment surrounding the film 90. Because the dissolved gas in the interior regions of the polymer film 90 must migrate through the regions of the polymer film 90 that are closer to the film's surface to escape from the polymer film 90, the dissolved gas in the interior regions begins to migrate after the dissolved gas in the surface regions begins to migrate, and takes more time to reach the ambient environment surrounding the polymer film 90 than the dissolved gas 98 in the film's regions that is closer to the film's surface. Thus, before heating the polymer film 90 to a temperature that is or is close to its glass transition temperature, one can modify the concentration of dissolved gas 98 in regions of the polymer film 90 by exposing the polymer film 90 to an atmosphere having less pressure than the one in the first step for a period of time. Because the concentration of dissolved gas 98 depends on the amount of gas that escapes into the ambient environment surrounding the polymer film 90, the concentration of dissolved gas 98 is inversely proportional to the period of time that the film 90 is exposed to the low-pressure atmosphere before being heated to its or close to its glass transition temperature.

In this manner, a skin, such as the skin 94 (FIG. 5), may be formed in the polymer film 90 when the film 90 is heated to a temperature that is or is close to its glass transition temperature. For example, in this and certain other embodiments, the roll 106 of polymer film and interleaved material 104 can remain in a thermodynamically unstable state for a period of time before removing the material 104 from the roll 106 and heating the film. This allows some of the gas dissolved in the region of the film adjacent the film's surface to escape. With the gas absent from this region of the film, this region becomes more thermodynamically stable than the regions that are further away from the film's surface. With a sufficient amount of thermodynamic stability in the region, bubbles won't nucleate in the region when the film is heated close to its glass transition temperature. Consequently, closed cells 100 (FIG. 5) can be omitted from this region of the film, leaving a solid portion of the microstructure that is integral to the closed cell portion of the microstructure, such as the skin 94 (FIG. 5). Because the thickness of the skin 94 or solid portion depends on the absence of dissolved gas 98 in the region of the film 90, the thickness of the skin 94 or solid portion is directly proportional to the period of time that the film 90 spends in a thermodynamically unstable state before being heated to or substantially close to its glass transition temperature. In this and certain other embodiments, the thickness of the integral skin ranges 5-200 μm.

The next step 112 in the process is to nucleate and grow bubbles 100 (FIG. 5) in the polymer 90 to achieve a desired relative density for the polymer film 90. Bubble nucleation and growth begin about when the temperature of the polymer film 90 is or is close to the glass transition temperature of the polymer film 90 with the dissolved gas 98. The duration and temperature at which bubbles 100 are nucleated and grown in the polymer 90 may be any desired duration and temperature that provides the desired relative density. For example, in this and certain other embodiments, the temperature that the PET polymer is heated to is approximately 200°-280° Fahrenheit, which is about 40°-120° warmer than the glass transition temperature of the polymer without any dissolved gas 98. The PET film 90 is held at approximately 200°-280° Fahrenheit for approximately 30 seconds. This provides a relative density of the closed-cell film of about 18.5%. If the PET film 90 is held at 200°-280° Fahrenheit for a period longer than 30 seconds, such as 120 seconds, then the bubbles 100 grow larger, and thus the size of resulting closed cells are larger. This may provide a relative density of the closed cell film of about 10%-20%. If the PET film is held at 200°-280° Fahrenheit for a period shorter than 30 seconds, such as 10 seconds, then the bubbles 100 remain small, and thus the size of resulting closed cells are smaller. This may provide a relative density of the closed cell film of about 40%.

To heat the polymer film 90 that includes the dissolved gas 98, one may use any desired heating apparatus. For example, in this and certain other embodiments, the PET film may be heated by a roll fed flotation/impingement oven, disclosed in the currently pending U.S. patent application Ser. No. 12/423,790, titled ROLL FED FLOTATION/IMPINGEMENT AIR OVENS AND RELATED THERMOFORMING SYSTEMS FOR CORRUGATION-FREE HEATING AND EXPANDING OF GAS IMPREGNATED THERMOPLASTIC WEBS, filed 14 Apr. 2009, and incorporated herein by this reference. This oven suspends and heats a polymer film that moves through the oven, without restricting the expansion of the film.

The next step 114 in the process includes reducing the temperature of the heated polymer 90, and thus the malleability of the polymer 90 that occurs at or near the glass transition temperature, to stop the growth of the bubbles 100. The temperature of the heated polymer may be reduced using any desired technique. For example, in this and certain other embodiments, the polymer film 90 may be left to cool at ambient room temperature—i.e. simply removed from the heating apparatus. In other embodiments the heated polymer film 90 may be quenched by drenching it with cold water, cold air, or any other desired medium.

Other embodiments of the process are possible. For example, the polymer film 90 can be heated to a temperature that is or is close to its glass transition temperature when the polymer film 90 is initially exposed to an atmosphere that causes the gas dissolved in the polymer film 90 to become thermodynamically unstable. This allows one to make a film that does not include a skin or includes a skin having a minimal thickness.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A method for joining two components, the method comprising:
    positioning a thermoplastic polymer portion of a first component adjacent a thermoplastic polymer portion of a second component such that the first and second portions form an interface, wherein at least one of the portions includes a microstructure having a plurality of closed cells, each cell containing a void and each cell having a maximum dimension extending across the void within the cell that ranges between 1 micrometer and 200 micrometers long and wherein a plurality of the cells has a temperature equal to ambient temperature and includes gas in their respective voids in an amount sufficient to exert pressure on the microstructure; and
    after positioning the polymer portion, exerting pressure on the exterior of the thermoplastic polymer portions to form a bond at the interface that holds the portions together, wherein the positioning and exerting the pressure occurs before the gas in the voids equalizes with the surrounding environment such that the pressure from the gas in the voids helps the microstructure resist the pressure exerted on the thermoplastic polymer portions.

2. The method of claim 1 wherein the plurality of closed cells each has a maximum dimension that ranges between 1 micrometer and 50 micrometers.

3. The method of claim 1 wherein at least one of the thermoplastic polymer portions includes a skin having a surface that defines an exterior surface of the portion and that forms the interface with the other thermoplastic polymer portion.

4. The method of claim 1 wherein the at least one thermoplastic polymer portion that includes the microstructure that has a plurality of closed cells, also includes a skin having a surface that defines an exterior surface of the portion and that forms the interface with the other thermoplastic polymer portion.

5. The method of claim 1 wherein the thermoplastic polymer portion of the first component and the thermoplastic polymer portion of the second component each includes:
    a microstructure having a plurality of closed cells, each cell containing a void and each cell having a maximum dimension extending across the void within the cell that ranges between 1 micrometer and 200 micrometers long, and a skin having a surface that defines an exterior surface of the thermoplastic polymer portion and that forms the interface with the surface of the other thermoplastic polymer portion's skin.

6. The method of claim 1 wherein while pressure is exerted on the thermoplastic polymer portions to form a bond at the interface, the pressure inside each cell is equal to or greater than the pressure exerted on the thermoplastic polymer portions.

7. The method of claim 1 further comprising continually moving the first component's thermoplastic polymer portion and the second component's thermoplastic polymer portion in substantially the same direction while the thermoplastic polymer portions are positioned and pressure is exerted to form the bond.

8. The method of claim 1 wherein the pressure exerted on the thermoplastic polymer portions cause the portions to fuse at the interface.

9. The method of claim 1 further comprising heating a surface of at least one of the thermoplastic polymer portions, which forms the interface, to a temperature close to the surface's melting temperature, without causing a remainder of the portion to melt, before exerting pressure on the thermoplastic polymer portion.

10. The method of claim 1:
wherein the thermoplastic polymer portion of the first component and the thermoplastic polymer portion of the second component each includes:
a microstructure having a plurality of closed cells, each cell containing a void and each cell having a maximum dimension extending across the void within the cell that ranges between 1 micrometer and 200 micrometers long, and
a skin having a surface that defines an exterior surface of the thermoplastic portion and that forms the interface with the surface of the other thermoplastic portion's skin; and
further comprising heating each surface to a temperature close to the surface's melting temperature, without causing a remainder of each thermoplastic portion to melt, to help each skin coalesce with the other to form the bond at the interface.

11. The method of claim 10 further comprising cooling the interface to solidify the bond.

12. A method for making a panel, the method comprising:
positioning a first thermoplastic polymer sheet adjacent a second thermoplastic polymer sheet such that the first and second sheets form an interface, wherein at least one of the sheets includes a microstructure having a plurality of closed cells, each cell containing a void and each cell having a maximum dimension extending across the void within the cell that ranges between 1 micrometer and 200 micrometers long, and
wherein a plurality of cells has a temperature equal to ambient temperature and includes gas in their respective voids in an amount sufficient to exert pressure on the microstructure; and
after positioning the thermoplastic polymer sheets, exerting the pressure on the thermoplastic polymer sheets to form a bond at the interface that holds the sheets together, wherein the positioning and exerting the pressure occurs before the gas in the voids equalizes with the surrounding environment such that the pressure from the gas in the voids resists the pressure exerted on the thermoplastic polymer sheets.

13. The method of claim 12 wherein the first thermoplastic polymer sheet and the second thermoplastic polymer sheet each includes:
a microstructure having a plurality of closed cells, each cell containing a void and each cell having a maximum dimension extending across the void within the cell that ranges between 1 micrometer and 200 micrometers long, and
a skin having a surface that defines an exterior surface of the thermoplastic polymer sheet and that forms the interface with the surface of the other thermoplastic polymer sheet's skin.

14. The method of claim 12 wherein while pressure is exerted on the thermoplastic polymer sheets to form a bond at the interface, the pressure inside each cell is equal to or greater than the pressure exerted on the thermoplastic polymer sheets.

15. The method of claim 12:
wherein the first thermoplastic polymer sheet and the second thermoplastic polymer sheet each includes:
a microstructure having a plurality of closed cells, each cell containing a void and each cell having a maximum dimension extending across the void within the cell that ranges between 1 micrometer and 10 micrometers long, and
a skin having a surface that defines an exterior surface of the thermoplastic polymer sheet and that forms the interface with the surface of the other thermoplastic polymer sheet's skin; and
further comprising heating each surface to a temperature close to the thermoplastic polymer's melting temperature, without causing a remainder of first thermoplastic polymer sheet and a remainder of the second thermoplastic polymer sheet to melt, to help each skin coalesce with the other to form the bond at the interface.

16. The method of claim 15 further comprising cooling the interface to solidify the bond.

17. The method of claim 12 wherein the pressure exerted on the thermoplastic polymer sheets cause the sheets to fuse at the interface.

18. The method of claim 12 further comprising:
positioning a third thermoplastic polymer sheet adjacent the second thermoplastic polymer sheet such that the third and second sheets form a second interface, and wherein the second sheet lies between the first and third thermoplastic polymer sheets; and
exerting pressure on the third and first thermoplastic polymer sheets to form a bond at the second interface that holds the sheets together.

19. The method of claim 18 wherein the third sheet includes a microstructure having a plurality of closed cells, each cell containing a void and each cell having a maximum dimension extending across the void within the cell that ranges between 1 micrometer and 200 micrometers long.

* * * * *